Jan. 13, 1931.  C. S. HALL  1,788,430
AIRCRAFT PROPELLING MECHANISM
Filed July 6, 1929    2 Sheets-Sheet 1
Fig. 1
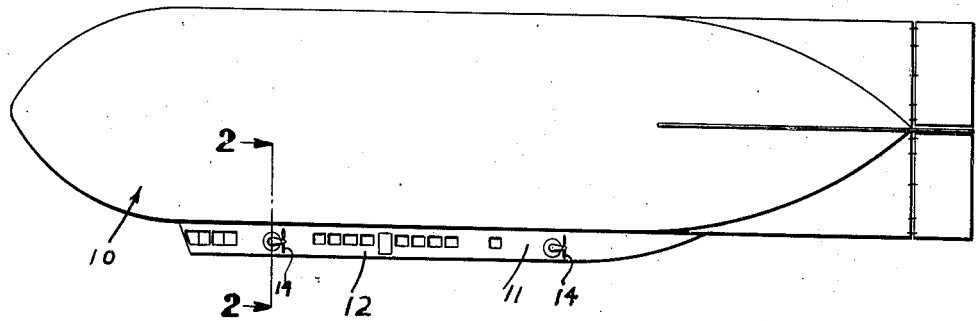
Fig. 2
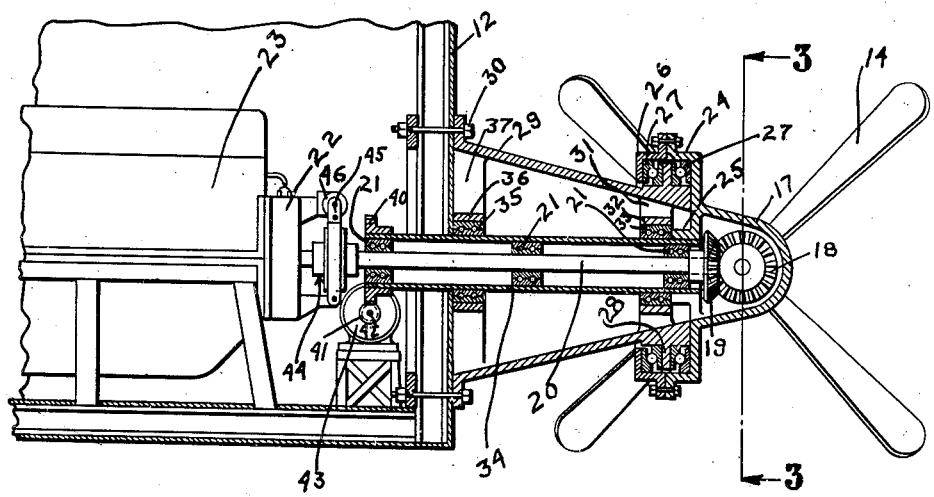
Fig. 3
Fig. 8
INVENTOR.
C. S. HALL
BY
ATTORNEY.

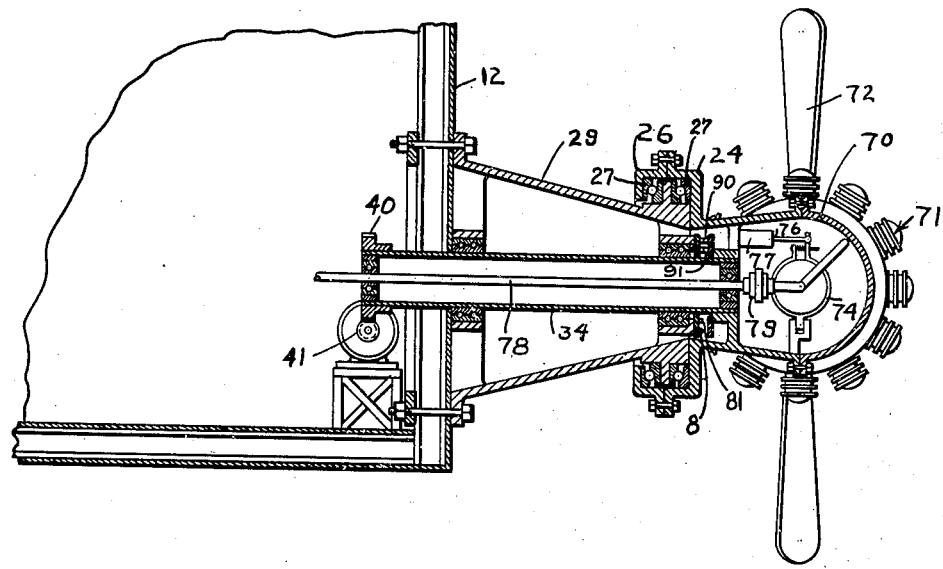

Patented Jan. 13, 1931

1,788,430

UNITED STATES PATENT OFFICE

CHARLES S. HALL, OF LOS ANGELES, CALIFORNIA

AIRCRAFT-PROPELLING MECHANISM

Application filed July 6, 1929. Serial No. 376,328.

This invention relates to improvements in aircraft propelling mechanisms.

The present invention is an improvement over that shown in my co-pending applications Serial No. 8,383, filed Feb. 11, 1925, now Patent Number 1,659,098, granted Feb. 14, 1928, and Serial No. 244,079, filed Jan. 3, 1928.

The general object of my invention is to provide an improved aircraft propelling device wherein the propeller is mounted in a novel manner so that it may be moved to positions to produce a thrust effect in various directions.

Another object of the invention is to provide a novel mounting means for an aircraft propeller.

Another object of the invention is to provide an aircraft propeller mounted to move so that the direction of thrust may be shifted and wherein means is provided for automatically cutting off the driving power to the propeller when the propeller is being shifted.

An additional object is to provide a novel clutch and brake controlled propeller for driving aircraft.

Other objects and advantages of the invention will be apparent from the following description taken in connection with the accompanying drawings wherein:

Fig. 1 is a side elevation of an aircraft embodying the features of my invention.

Fig. 2 is a fragmentary sectional view through the propeller mountings and associated parts on line 2—2, Fig. 1.

Fig. 3 is a section, line 3—3 of Fig. 2.

Fig. 4 is a view similar to Fig. 2 showing a modified construction.

Fig. 5 is a side elevation of the modified construction with parts broken away.

Fig. 6 is a wiring diagram illustrating circuits for operating the invention shown in Fig. 2 and Fig. 7 is a wiring diagram illustrating the circuits employed in the modification of Fig. 4.

Referring to the drawings by reference characters I have shown my invention as applied to an aircraft indicated generally at 10. This aircraft may be of any suitable type but is shown as including a keel structure wherein the keel 11 is provided with suitable passenger and freight compartments 12 and with operating propellers 14.

In the embodiment shown the propellers 14 are of the four blade type and are secured to a shaft 15 (Fig. 3) which is mounted in suitable bearings 16 in a cover 17. The shaft is provided with a bevel gear 18 which meshes with another bevel gear 19 keyed to a shaft 20, which shaft is mounted in spaced bearings 21 and which is driven through an electric magnetic clutch of suitable form and indicated generally at 22 from an engine which may be an internal combustion engine 23. The cover 17 is provided with an outer peripheral flange 24 and with an inner peripheral flange 25 which are shown as integral therewith.

The outer peripheral flange 24 has a flanged collar 26 connected thereto and the flange of this collar together with the portion of the cover adjacent the outer flange 24 serve to hold bearing members such as ball races 27 which are spaced apart by a flange 28 mounted on a housing 29 which is secured by a bolts 30 to the wall of the compartment 12. The parts are so arranged that the cover 17 together with the flanged collar 26 may rotate on the bearings 27 so that the propellers may be shifted to alter the direction of thrust. The housing is provided with a spider 31 which includes an inner sleeve 32 in which a bearing 33 is fitted.

The bearings 21 are mounted in a sleeve 34 which is keyed to the cover 17 and within which the bearings 21 previously mentioned are mounted. The sleeve 34 is mounted to turn in the bearing 33 and in another bearing 35 mounted in a collar 36 which is supported by a spider 37 on the housing 29.

It will thus be seen that the shaft 20 is mounted for movement within, but independent of, the sleeve 34 and that the sleeve also has rotary movement with the housing cover.

In order to rotate the sleeve 34 I secure a worm 40 upon the inner end thereof, this worm 40 meshes with a worm wheel 41 secured on a shaft 42 which is shown as the armature shaft of a motor 43 and it will be seen that as the motor 43 is operated the sleeve 34 will be rotated and consequently the angle of thrust of the propellers 14 will be shifted.

Operation of the shaft 20, as previously stated, is controlled through the clutch 22 and in addition to the clutch 22 I provide a brake 44 on the shaft 20. The brake 44 has an operating member 45 which may be operated through the solenoid 46.

In Fig. 6 I have shown a wiring diagram wherein the negative feed line is indicated at 50 and the positive feed line is indicated at 51, the motor 43 is connected by a lead 52 with the negative line 50 and is also connected by a lead 53 with the positive feed line 51. The lead 53 includes a switch 54.

A circuit closer 55 includes an electromagnet 56, one terminal of which is connected by a lead 57 with the lead 53 and the other terminal of which is connected by a lead 58 with the line 50.

The circuit closer 55 is adapted to bridge two terminals 59 and 60, the terminal 59 being connected by a lead 61 with the line 51 while the terminal 60 is connected by a lead 62 to a lead 63 attached to one terminal of the electromagnetic clutch 22, the other terminal of the clutch magnet being connected to the line 50. The lead 62 is connected to a lead 66 which is in turn connected to one terminal of the solenoid winding 46, the other lead of which is connected by a lead 67 to the lead 65, previously mentioned.

The operation of the device is as follows: Assuming that the engine 23 is running and that the clutch 22 is engaged. The operator closes the switch 54 causing the motor 43 to operate and through the gears 40 and 41 to turn the sleeve 21 and thereby shift the angle of thrust of the propeller. As the switch 54 is closed the circuit through the leads 57 and 58 to the solenoid 56 are closed thereby energizing the solenoid and causing the circuit closer 55 to close the circuit through the terminals 59 and 60. This energizes the clutch magnet 52, causing the clutch to be released and also energizes the magnet 46 causing the brake to be applied. The application of the brake slows down the propeller so that the cover can be readily turned without hindrance due to the centrifugal action of the propeller.

In the modification shown in Fig. 4 the housing 29, sleeve 34, motor 43, gears 40 and 41, flange collar 26 and outer flange 24, are similar to such parts previously described. The cover 70, however, differs in that this cover is associated with a radial engine 71 which has a propeller 72 thereon. The cover 70 is preferably stream line and in the rear portion thereof I provide a brake 74 which is on the drive shaft 75 of the engine. This brake includes an operating member 76 which is connected to the core of a solenoid 77.

The engine 71 is supplied with fuel through a fuel line 78 which includes a swivel joint 79. The engine includes suitable ignition devices including collector rings 80 and 81.

In Fig. 7 I have indicated a negative lead 82 and a positive lead 83 which may be connected with a suitable source of power. The lead 83 is connected by a lead 84 with a terminal 85 which is adapted to be engaged by an electromagnetically controlled circuit closer 86 having an electro-magnet 87. The circuit closer 86 completes the circuit through a second terminal 88 connected by a lead 89 with the collector ring 80 whence the current flows through the lead 90, the ignition system of the engine 71, to a lead 91, to the collector ring 81, and through a lead 92, to the lead 82. The motor 43 is connected by a lead 93 to the lead 82, and by a lead 94 with a lead 95 which includes a switch 96 to the lead 83.

The lead 95 is also connected by a lead 97 with the magnet 87 whence a lead 98 extends to the lead 82.

A contact 100 is connected by a lead 101 with the lead 83, while a companion contact 102 is connected by lead 103 with the solenoid 77 whence a lead 104 extends to the lead 82.

In operation to shift the propeller thrust the operator closes the switch 96 thereby closing the circuit through the leads 93, 94, and 95 to the motor 43, causing the latter to operate and to swing the propeller cover 70 and the propeller to alter the angle or direction of thrust of the latter.

The closing of the switch 96 also closes the circuit through leads 95, 97 and 98 to the electro-magnet 87 thereby energizing the latter and moving the circuit closer 86 so that the terminals 85 and 88 are unbridged thereby cutting off the current to the engine ignition system. The circuit closer 86 then closes the circuit across the terminals 100 and 102 to complete the circuit through the solenoid 77 to thereby cause brake 74 to be applied.

With either modification when the control switches 54 and 96 are moved to open position the prime movers will again be effective to drive the propellers.

From the foregoing description it will be apparent that I have provided a highly efficient and effective propeller control mechanism which enables ready maneuver of the aircraft having my invention thereon.

Having thus described my invention, I claim:

1. In an aircraft including a body, a propeller support movably mounted on said body, means to move said support, a propeller on said support, a prime mover, means whereby said prime mover drives said propeller, said means including a clutch and a brake associated with said drive means and automatic means to operate said clutch and brake when said propeller support is being moved.

2. In an aircraft including a body portion, a propeller support mounted to rotate on said body, a propeller, a prime mover, means to drive said propeller from said prime mover, means to shift said propeller support and means to automatically render said first means inactive when said second means is operating.

3. In an aircraft including a body portion, a propeller shiftable on said body to alter the thrust of said propeller, means to drive said propeller, said propeller drive including a clutch and means to automatically release said clutch when the propeller is being shifted to alter the thrust.

4. In an aircraft including a body portion, a propeller support mounted to rotate on said body, a propeller, a prime mover, means to drive said propeller from said prime mover, means to shift said propeller support, and an automatic means to render said first means inactive when said second means is active.

5. In an aircraft including a body portion, a propeller shiftable on said body to alter the thrust of said propeller, means to drive said propeller, means to shift said propeller, said propeller drive means including a clutch and brake and means to automatically release said clutch and apply said brake when said propeller shifting means becomes active.

6. In an aircraft including a body portion, a propeller support mounted to rotate on said body portion, a propeller mounted to rotate on said support, means to drive said propeller, means to rotate said propeller support, a brake associated with said propeller drive means and means to automatically apply said brake when the propeller support is rotated.

7. In an aircraft including a body portion, a propeller, a rotatable propeller support, a shaft adapted to drive said propeller, a prime mover, means whereby said prime mover drives said shaft, means to rotate said propeller support, and means to automatically render said prime mover ineffective to drive said propeller when said propeller support is being rotated.

8. In an aircraft including a body portion, a propeller shiftably mounted on said body and movable to alter the propeller thrust, means to drive said propeller, means to shift said propeller, said propeller drive including a brake and means to automatically apply said brake when said propeller shifting means is rendered active.

9. In an aircraft including a body, a propeller housing on said body, a cover mounted to rotate on said housing, said propeller being mounted on said cover, a prime mover, means to drive said propeller from said prime mover, means to rotate said propeller and cover, said propeller drive including a clutch and brake and means to automatically release said clutch and apply said brake when said cover rotating means is rendered active.

10. In an aircraft including a body portion, a propeller, a propeller support mounted to rotate on said body, a shaft adapted to drive said propeller, a second shaft, means whereby said second shaft drives said first shaft, a prime mover, clutch means adapted to operatively connect said second shaft and prime mover, a sleeve on said propeller support, a gear on said sleeve, means to drive said gear to thereby rotate said propeller support and means in said sleeve to support said second shaft.

11. In an aircraft including a body portion, a propeller support rotatable on said body, a propeller mounted on said propeller support, a prime mover, means to drive said propeller from said prime mover, means to rotate said propeller support, electrically controlled means to actuate said propeller support rotating means, a brake to control rotation of said propeller, and automatic means to apply said brake when said electrically controlled means is active to cause said support to rotate.

12. In an aircraft including a body, a propeller on said body, said propeller being shiftably mounted, a prime mover, means to drive said propeller from said prime mover, means to shift said propeller, said propeller drive including a clutch, electrically controlled means to render said shifting means effective and means to automatically release said clutch when said propeller shifting means is active.

In testimony whereof, I hereunto affix my signature.

CHARLES S. HALL.